United States Patent
Lee

(10) Patent No.: US 7,426,369 B2
(45) Date of Patent: Sep. 16, 2008

(54) BLUETOOTH APPLIANCE HAVING NON-MEMORY PROGRAMMABLE IDENTIFICATION ADDRESS STORING DEVICE AND TELECOMMUNICATION METHOD THEREOF

(75) Inventor: Ki-Jong Lee, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 430 days.

(21) Appl. No.: 10/869,113

(22) Filed: Jun. 16, 2004

(65) Prior Publication Data
US 2004/0259501 A1   Dec. 23, 2004

(30) Foreign Application Priority Data
Jun. 18, 2003   (KR) .................. 10-2003-0039354

(51) Int. Cl.
*H04B 7/00*   (2006.01)
(52) U.S. Cl. .................. 455/41.2; 455/41.1; 455/66.1
(58) Field of Classification Search ............... 455/41.2, 455/66.1, 41.1
See application file for complete search history.

(56) References Cited

U.S. PATENT DOCUMENTS

| 6,130,468 | A | * | 10/2000 | Lee et al. ............... 257/529 |
| 6,208,570 | B1 | * | 3/2001 | Brown et al. ............ 365/201 |
| 6,865,371 | B2 | * | 3/2005 | Salonidis et al. .......... 455/41.1 |
| 2003/0123301 | A1 | * | 7/2003 | Jang et al. ............... 365/200 |
| 2004/0022210 | A1 | * | 2/2004 | Frank et al. ............. 370/328 |
| 2004/0205207 | A1 | * | 10/2004 | Motoyama ............... 709/230 |

* cited by examiner

*Primary Examiner*—Tuan H Nguyen
(74) *Attorney, Agent, or Firm*—Frank Chau & Associates, LLC

(57) ABSTRACT

An appliance having programmable identification address storing non-memory includes a non-memory programmable address storing device. An ID address of the appliance is programmed using an electric fuse even when the appliance does not include non-volatile memory (NVM) or another memory. Accordingly, in portable appliances such as a portable audio device (an MP3 player) that supports Bluetooth communications the ID address can be stored by the appliance. Further, ID addresses of appliances, such as transmitting/receiving devices used in IEEE communications and mobile communications, can be stored without a need for NVM or another memory. The ID addresses can be assigned to these appliances by programming of an application designer.

18 Claims, 4 Drawing Sheets

BLUETOOTH APPLIANCE HAVING NON-MEMORY PROGRAMMABLE IDENTIFICATION ADDRESS STORING DEVICE AND TELECOMMUNICATION METHOD THEREOF

BACKGROUND OF THE INVENTION

1. Field of the Invention

The present invention relates to Bluetooth communications, and more particularly, to a Bluetooth appliance having a programmable non-memory storage device and a telecommunication method thereof.

2. Description of Related Art

To realize various functions needed for device communications, there have appeared a number of appliances that store an identification (ID) or ID address for device recognition. These appliances, such as a portable audio device (e.g., an MP3 player) having an ID used in device authorization to receive contents, a portable video device (e.g., a digital camera), and the like, may include a built-in Bluetooth system having an ID used in inter-device recognition and information exchange. Also, since a caller address and a destination address are typically transmitted in Institute of Electrical and Electronics Engineers (IEEE) communications or mobile communications, a transmitting/receiving device has an ID.

Bluetooth was initially developed by the Swedish company Ericsson, with the aim of replacing wired cables for data communications with wireless connections. The connections can be between such devices as a portable phone, a personal computer (PC), a digital still camera, a printer, a personal digital assistant (PDA), a game console, and the like. A baseband in a Bluetooth module is connected to a radio frequency (RF) module and manages connections between Bluetooth devices at the lowest communication layer. Bluetooth uses a frequency band of 2.4 GHz with a frequency range of 79 MHz. The frequency band is divided into 79 channels, each 1 MHz wide. With some exceptions, Bluetooth uses 79 channels (in some countries, 23 channels are used). The baseband changes channels 1600 times per second. Arithmetically, each channel is selected about 20 times per second.

Bluetooth communications have a hop sequence that can be recognized between Bluetooth devices. This hop sequence is determined by ID addresses of the Bluetooth devices. These ID addresses are similar to media access control (MAC) addresses of network interface cards (NIC: also referred to as LAN cards). Thus, Bluetooth devices can identify one Bluetooth device from among a number of Bluetooth devices using the ID addresses. An example of an identification technique is frequency hopping spread spectrum (FHSS). An application designer can assign an ID address to a Bluetooth device. In most cases, an ID address is assigned to non-volatile memory (hereinafter, referred to as "NVM") of a NVM built-in system in the form of program. If there is no NVM but memory is embedded in a host, an ID address of a Bluetooth device is stored using the embedded memory or the host's ID address stored in the embedded memory is used for device recognition. However, in a case of a small-size, low-price, low-current device, the ID address is stored in read only memory (ROM). The ROM stores information such as addresses through a semiconductor process progressing according to a design on a mask. In a Bluetooth device implementing ROM an application designer cannot freely assign an ID address to the Bluetooth device. That is, in a system whose host does not include NVM or another memory, an ID address for Bluetooth cannot be programmed and stored.

Portable devices, such as a portable audio device (e.g., an MP3 player) or a portable video device (e.g., a digital still camera), can download audio files or moving picture files via a computer from a web server that provides content through the Internet. The web server providing content manages content files, interprets authentication information transmitted from a computer, and identifies user IDs, appliance ID addresses, and the like. If authentication is successful, the web server provides content via the computer to the appliances. However, when an application designer assigns ID addresses to appliances, there appears a problem similar to a case where an ID is assigned to a Bluetooth device.

Since an ID address of a transmitting/receiving device is used to transmit information in IEEE communications or mobile communications, the ID address of the transmitting/receiving device in the appliance needs to be programmed and stored. However, in a system whose host does not include NVM or another memory, an ID address for the transmitting/receiving device cannot be programmed and stored.

SUMMARY OF THE INVENTION

An appliance comprises a non-memory programmable identification (ID) address storage device capable of programming an ID address of the appliance using an electric fuse, wherein the appliance does not include non-volatile memory (NVM) or another memory.

A telecommunication method of an appliance having non-memory programmable identification (ID) address storage device programs an ID address of the appliance using an electric fuse, wherein the appliance does not include non-volatile memory (NVM) or another memory.

According to an embodiment of the present invention, an appliance comprises a Bluetooth host and Bluetooth module. The Bluetooth host supports Bluetooth communications. The Bluetooth module, through Bluetooth communications, identifies another host using a hop sequence corresponding to an address pattern set by an electric fuse, transmits information output from the Bluetooth host to an identified host, and outputs information received from the identified host to the Bluetooth host.

The Bluetooth module comprises a random access memory (RAM), a read only memory (ROM), a non-memory programmable address storing unit, and a central processing unit (CPU). The RAM temporarily stores a program. The ROM stores data used to operate the Bluetooth communications. The non-memory programmable address storing unit receives the address pattern, sets the address pattern using the electric fuse, and outputs bit values of the address pattern set to different logic states according to an open state or a closed state of the electric fuse. The CPU uses the RAM while controlling the Bluetooth communications according to data of the ROM, determines the hop sequence corresponding to the set address pattern, and controls information exchange with the identified host.

The non-memory programmable address storing unit comprises a plurality of address setting/storing bits that receive and set the address pattern in response to an activated write enable signal and output set bit values of the address pattern in response to an activated read enable signal. Each of the plurality of address setting/storing bits comprises an address setting control unit, a fuse, and an address extracting control unit. The address setting control unit supplies or blocks a first supply voltage and a second supply voltage according to a logic state of a corresponding bit value of the input address pattern in response to the activated write enable signal. The fuse comprises cuttable metal that connects both terminals of the fuse. The metal is cut using the first supply voltage and the second supply voltage provided to both terminals of the fuse. The address extracting control unit outputs bit values of different logic states corresponding to opening or closing of the fuse.

The first supply voltage and the second supply voltage are in a logic high state and in a logic low state, respectively.

The metal that connects both terminals of the fuse is made of conductive polysilicon.

The address setting control unit and the address extracting control unit are semiconductor circuits using metal-oxide-semiconductor field effect transistors (MOSFET).

The Bluetooth host is a portable audio/video device or a transmitting/receiving device for mobile communications that supports the Bluetooth communications.

The Bluetooth communications is performed using frequency hopping spread spectrum.

According to an embodiment of the present invention, an appliance comprises a Bluetooth host and a Bluetooth module. The Bluetooth host supports Bluetooth communications, identifies another host using a hop sequence corresponding to an address pattern set by an electric fuse, outputs to-be-transmitted information to the identified host, and displays output information of the identified host. The Bluetooth module, through the Bluetooth communications, receives the to-be-transmitted information, outputs the information to the identified host, processes information received from the identified host, and outputs the output information of the identified host.

The Bluetooth host comprises a RAM, a ROM, a non-memory programmable address storing unit, and a CPU. The RAM temporarily stores a program. The ROM stores data used to operate the Bluetooth communications. The non-memory programmable address storing unit receives the address pattern, sets the address pattern using the electric fuse, and outputs bit values of the address pattern set to different logic states according to an open state or a closed state of the electric fuse. The CPU uses the RAM while controlling the Bluetooth communications according to data of the ROM, determines the hop sequence corresponding to the set address pattern, and controls information exchange with the identified host.

According to an embodiment of the present invention, a telecommunication method of an appliance including a Bluetooth host supports Bluetooth communications and a Bluetooth module that exchanges information with another host through the Bluetooth communications. The telecommunication method comprises setting and outputting an address pattern by using an electric fuse, identifying another host by using a hop sequence corresponding to the output address pattern, transmitting information output from the Bluetooth host to the identified host, and outputting information received from the identified host to the Bluetooth host.

The setting and outputting the address pattern comprises receiving and setting the address patterns in response to an activated write enable signal and outputting bit values of the set address pattern in response to an activated read enable signal.

The setting a bit value of the address pattern and outputting the set bit value comprises an address setting control step of supplying or blocking a first supply voltage and a second supply voltage according to a logic state of corresponding bit value of the input address pattern in response to the activated write enable signal, a fusing step of cutting metal that connects both terminals of a fuse by using the first supply voltage and the second supply voltage provided to both terminals of the fuse, and an address extracting control step of outputting bit values of different logic state corresponding to an open state or a closed state of the fuse in response to the activated read enable signal.

The first supply voltage and the second supply voltage are in a logic high state and in a logic low state, respectively.

The metal that connects both terminals of the fuse is made of conductive polysilicon.

The address setting control and the address extracting control are performed by semiconductor circuits using metal-oxide-semiconductor field effect transistors (MOSFET).

The Bluetooth host is a portable audio/video device or a transmitting/receiving device for mobile communications that supports the Bluetooth communications.

The Bluetooth communications is performed using frequency hopping spread spectrum.

BRIEF DESCRIPTION OF THE DRAWINGS

The present invention will become more apparent by describing in detail exemplary embodiments thereof with reference to the attached drawings in which.

DETAILED DESCRIPTION OF PREFERRED EMBODIMENTS

Figure 1:
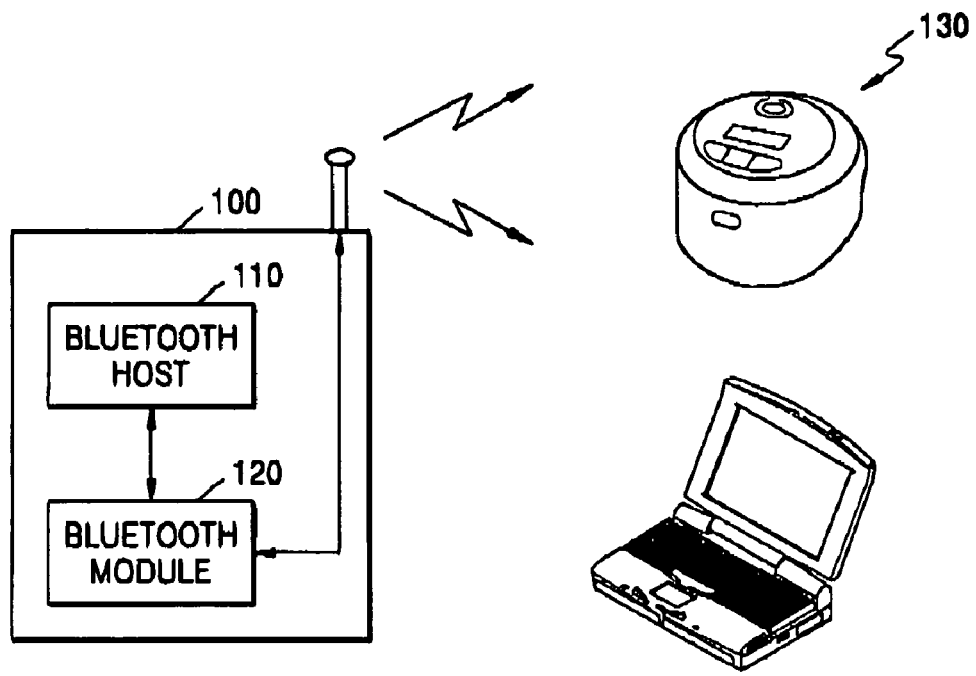
FIG. 1 is a block diagram of an appliance according to an embodiment of the present invention and external hosts.

The present invention will now be described more fully with reference to the accompanying drawings, in which preferred embodiments of the invention are shown. In the drawings, like reference numerals are used to refer to like elements throughout.

FIG. 1 is a block diagram of an appliance according to an embodiment of the present invention and external hosts.

Referring to FIG. 1, an appliance 100 includes a Bluetooth host 110 and a Bluetooth module 120. The appliance 100 including the Bluetooth hose 110 and Bluetooth module 120 can communicate with other hosts 130, such as a rice pot and a notebook personal computer (PC), that support Bluetooth communications.

The Bluetooth host 110 supports Bluetooth communications. Here, the Bluetooth host 110 may be, for example, a portable audio/video device or a transmitting/receiving device for mobile communications that supports Bluetooth communications.

Through Bluetooth communications, the Bluetooth module 120 identifies another host(s) (e.g., the rice pot and/or the notebook PC) using a hop sequence corresponding to an address pattern that is set by an electric fuse. The Bluetooth module 120 transmits information output from the Bluetooth host 110 to the identified host(s) and outputs information received from the identified host(s) to the Bluetooth host 110. The Bluetooth communications are performed using Frequency Hopping Spread Spectrum (FHSS).

Figure 2:
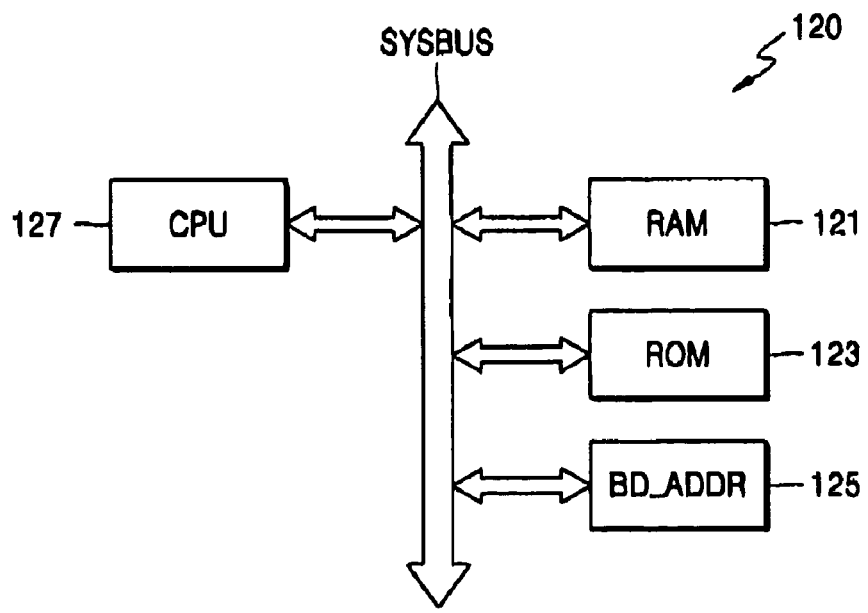
FIG. 2 is a block diagram of a Bluetooth module of FIG. 1 including a non-memory programmable address storing unit.

FIG. 2 is a block diagram of the Bluetooth module 120 of FIG. 1, including a non-memory programmable address storing unit.

The Bluetooth module 120 includes a random access memory (RAM) 121, a read only memory (ROM) 123, a non-memory programmable address storing unit BD_ADDR 125, and a central processing unit (CPU) 127. Data or signal input/output operations of the Bluetooth module 120 are performed through a system bus SYSBUS.

The RAM 121 temporarily stores a program.

The ROM 123 stores data used to operate Bluetooth communications.

The non-memory programmable address storing unit BD_ADDR 125 receives the address pattern, sets the address pattern using the electric fuse, and outputs bit values of the address pattern that are set to different logic states corresponding to an open state or a closed state of the electric fuse.

The CPU 127 uses the RAM 121 while controlling Bluetooth communications according to data of the ROM 123, determines the hop sequence corresponding to the set address pattern, identifies another host, and controls an information exchange with the identified host.

Figure 3:
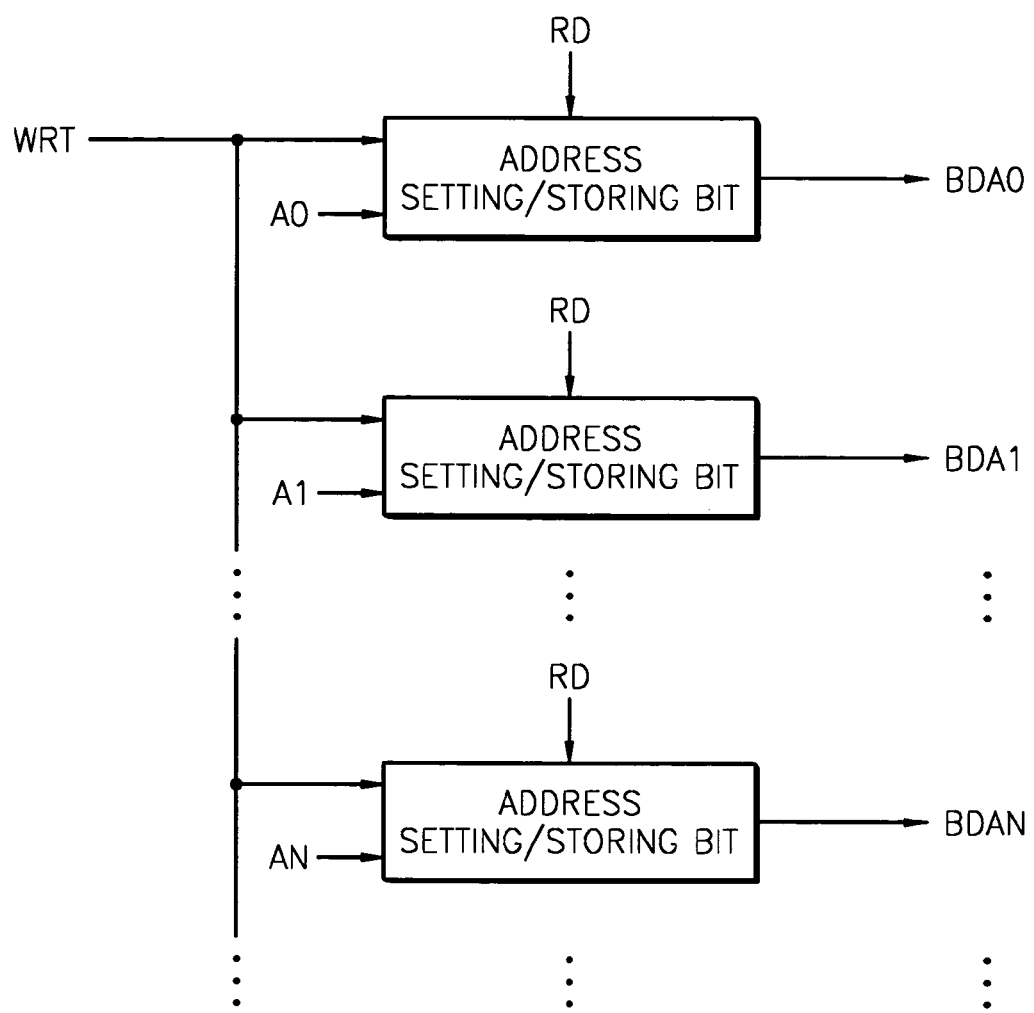
FIG. 3 is a block diagram of the non-memory programmable address storing unit of FIG. 2.
Figure 4:
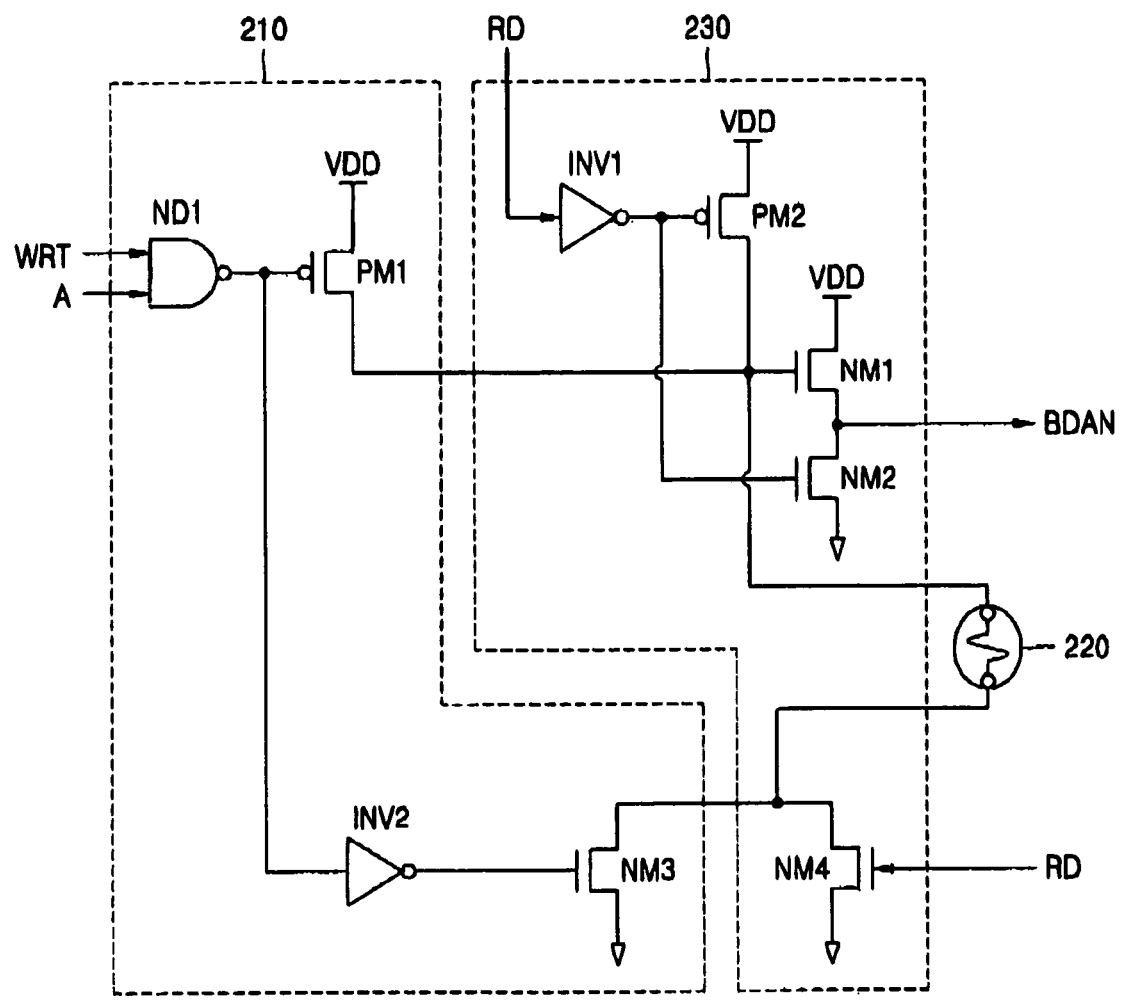
FIG. 4 is a circuit diagram for address setting/storing bits of FIG. 3.

FIG. 3 is a block diagram of the non-memory programmable address storing unit BD_ADDR 125 of FIG. 2, and FIG. 4 is a circuit diagram for address setting/storing bits of FIG. 3.

Referring to FIG. 3, the non-memory programmable address storing unit BD_ADDR 125 is a storing device in an appliance that stores an ID address used for communications between appliances and includes a plurality of address setting/storing bits. The plurality of address setting/storing bits receive and set address pattern A0-AN in response to an activated write enable signal WRT and output bit values BDA0-BDAN of the set address pattern A0-AN.

The address pattern A0-AN is to be used as an ID address of an appliance for communications between appliances. The application designer can input the address pattern A0-AN to the non-memory programmable address storing unit BD_ADDR 125 and program the ID address of the appliances. The number of address setting/storing bits can be defined by the application designer.

Referring to FIG. 4, each of the plurality of address setting/storing bits includes an address setting control unit 210, a fuse 220, and an address extracting control unit 230.

The address setting control unit 210 supplies or blocks a first voltage VDD and a second voltage (ground) according to a logic state of corresponding bit value A among the input address pattern A0-AN in response to the write enable signal WRT. The first voltage VDD and the second voltage (ground) are in a logic high state and in a logic low state, respectively. As shown in FIG. 4, the address setting control unit 210 is a semiconductor circuit using metal-oxide-semiconductor field effect transistors (MOSFET).

For example, when the write enable signal WRT is activated to a logic high state and a corresponding bit value A among the address pattern A0-AN is in a logic high state, a first PMOSFET PM1 and a third NMOSFET NM3 are turned on by operations of a NAND gate ND1 and a second inverter INV2. Thus, the address setting control unit 210 supplies the first supply voltage VDD and the second supply voltage (ground). In addition, when the write enable signal WRT is activated to a logic high state and the corresponding bit value A among the address pattern A0-AN is in a logic low state, the first PMOSFET PM1 and the third NMOSFET NM3 are turned off by operations of the NAND gate ND1 and the second inverter INV2. Thus, the address setting control unit 210 blocks the first supply voltage VDD and the second supply voltage (ground).

The metal that connects the terminals of the fuse 220 is cut using the first supply voltage VDD and the second supply voltage (ground) that are connected to a first terminal and a second terminal of the fuse 220, respectively. The metal connecting the terminals of the fuse 220 is made of conductive polysilicon. The width and thickness of a polysilicon-line are designed to have such a cross section that when current flowing between the first supply voltage VDD and the second supply voltage (ground) generates Joule heat above a threshold the polysilicon-line is cut. The threshold corresponds to the width and thickness of the polysilicon-line.

In response to an activated read enable signal RD, the address extracting control unit 230 outputs bit values of different logic states corresponding to an open state or a closed state of the fuse 220. An output bit value BDAN is one of the address pattern A0-AN, e.g., one of bit values forming the ID address of the appliance. The address extracting control unit 230 is a semiconductor circuit using MOSFETs.

For example, when the read enable signal RD is activated to a logic high state and the fuse 220 is cut and opened, a first NMOSFET NM1 is turned on and a second NMOSFET NM2 is turned off by operations of the first inverter INV1 and a second PMOSFET PM2. Thus, the address extracting control unit 230 outputs a logic-high bit value BDAN of the ID address of the appliance. When the read enable signal RD is activated to a logic high state and the fuse 220 is not cut and closed, the first NMOSFET NM1 and the second NMOSFET NM2 are turned off by operations of the first inverter INV1, the second PMOSFET PM2, and a fourth NMOSFET NM4. Thus, the address extracting control unit 230 outputs a logic-low bit value BDAN of the ID address of the appliance. To allow the address extracting control unit 230 to output the logic-low bit value BDAN of the ID address of the appliance, an output signal of the bit value BDAN at a connection point of the first NMOSFET NM1 and the second NMOSFET NM2 may be amplified, or the connection point of the first NMOSFET NM1 and the second NMOSFET NM2 may be reset when the appliance is powered on.

The non-memory programmable address storing unit BD_ADDR 125 can be built into the Bluetooth host 110. The non-memory programmable address storing unit BD_ADDR 125 of FIG. 3 to which the address pattern A0-AN, e.g., the ID address of the appliance, is assigned by an application designer can be built into the Bluetooth host 110 of FIG. 1. FIG. 2 is a peripheral block diagram of the Bluetooth host 110 including the non-memory programmable address storing unit BD_ADDR 125.

As described above, if the non-memory programmable address storing unit BD_ADDR 125 is built into the Bluetooth host 110, the Bluetooth host 110 supports Bluetooth communications, identifies another host(s) using a hop sequence corresponding to an address pattern set by the electric fuse, outputs to-be-transmitted information to the identified host, and displays output information of the identified hosts.

Through Bluetooth communications, the Bluetooth module 120 receives the to-be-transmitted information, transmits the information to the identified host, processes information received from the identified host, and outputs the output information of the identified host.

As shown in FIG. 2, the Bluetooth host 110 includes the RAM 121, the ROM 123, the non-memory programmable address storing unit BD_ADDR 125, and the CPU 127. Data or signal input/output operations of the Bluetooth host 110 are performed through the system bus SYSBUS. Operations of the RAM 121, the ROM 123, the non-memory programmable address storing unit BD_ADDR 125, and the CPU 127 are the same as the foregoing descriptions.

Figure 5:
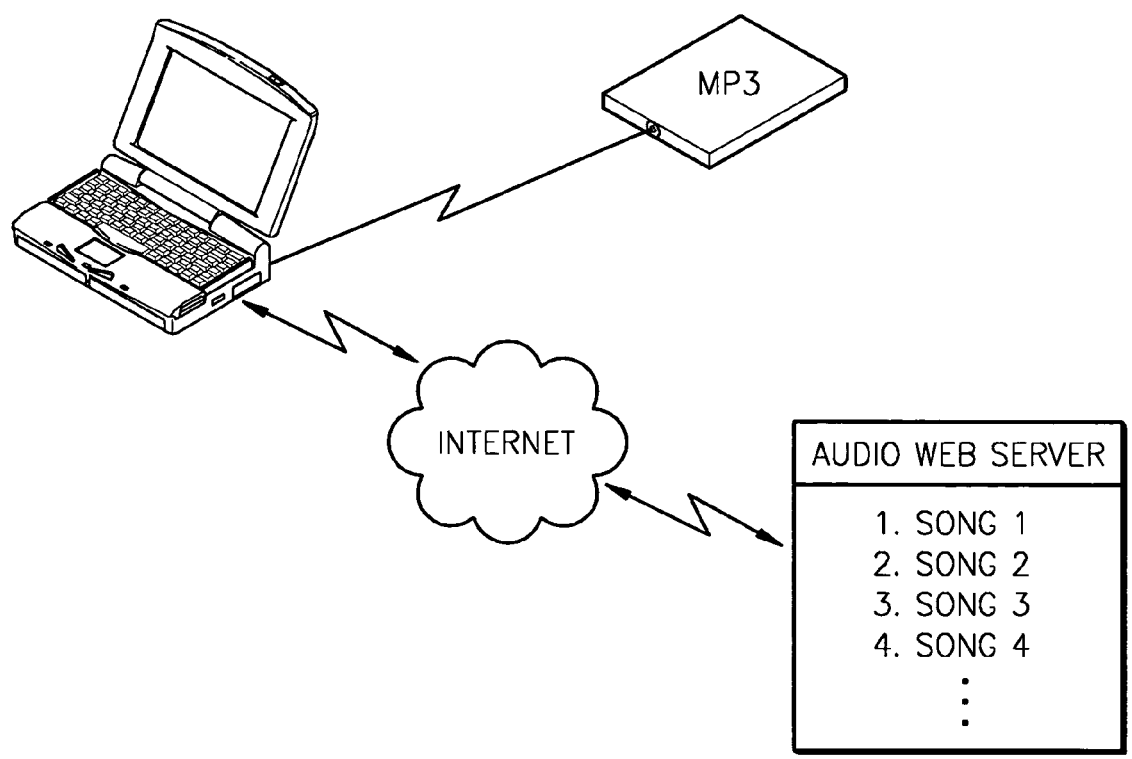
FIG. 5 illustrates another example including the non-memory programmable address storing unit of FIG. 2.

FIG. 5 illustrates an example including the non-memory programmable address storing unit BD_ADDR 125 according to an embodiment of the present invention.

Referring to FIG. 5, the non-memory programmable address storing unit BD_ADDR 125 of FIG. 3 can be built in a device, for example, a portable audio device such as an MP3 player that supports Bluetooth communications or a portable video device such as a digital still camera that supports Bluetooth communications.

The non-memory programmable address storing unit BD_ADDR 125 of FIG. 3 to which the address pattern A0-AN, e.g., the ID address of the appliance, is assigned by an application designer can be built in portable audio/video devices such as the MP3 player or digital still camera that supports Bluetooth communications. When communicating with a web server through the Internet via a computer, the portable audio/video devices can provide authentication information such as an ID address of an appliance to the web server and download audio files or moving picture files upon a successful authentication performed by the web server.

In IEEE communications or mobile communications, the non-memory programmable address storing unit BD_ADDR 125 of FIG. 3 can be used to store an ID address of an appliance in a transmitting/receiving device so as to exchange information between terminals using the ID address of the appliance such as media access control (MAC) addresses.

The non-memory programmable address storing unit BD_ADDR 125 according to an embodiment of the present invention includes the fuse 220 comprising a cuttable metal that connects the terminals of the fuse 220. The metal can be cut using the first supply voltage VDD and the second supply voltage (ground) that are provided to the terminals of the fuse 220. An ID address of an appliance can be programmed by selectively cutting fuses even when the appliance does not include NVM or another memory. When the write enable signal WRT is activated, the fuse 220 is cut and closed according to a logic state of corresponding bit value (A of FIG. 2) of address pattern (A0-AN of FIG. 1). When the read enable signal RD is activated, a bit value (BDAN of FIG. 2) of the address pattern set by the fuse 220 is output. At this time, an output bit value (BDAN of FIG. 2) has different logic states according to opening or closing of the fuse 220.

As described above, an appliance according to an embodiment of the present invention includes a non-memory programmable address storing device. An appliance ID address is programmed using an electric fuse even when the appliance does not include NVM or another memory. Accordingly, in portable appliances such as a portable audio device (an MP3 player) that support Bluetooth communications can store the appliance ID address therein. A portable video device (e.g., a digital still camera) or transmitting/receiving devices used in IEEE communications and mobile communications, can store ID addresses of these appliances without a need for NVM or another memory. The ID addresses can be assigned to these appliances by a programming operation of an application designer.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. An appliance comprising:
   a first host, which supports Bluetooth communications; and
   a module, which, through Bluetooth communications, identifies a second host using a hop sequence corresponding to an address pattern set according to an open state or a closed state of an electric fuse, wherein the address pattern corresponds directly to bit values of different logic states corresponding to the open state or closed state of the fuse, transmits information output from the first host to the second host, and outputs information received from the second host to the first host, wherein the module comprises a non-memory programmable address storing unit, which receives the address pattern, sets the address pattern using the electric fuse, and outputs bit values of the address pattern set to different logic states according to an open state or a closed state of the electric fuse, wherein the non-memory programmable address storing unit comprises:
   a plurality of address setting/storing bits that receive and set the address pattern in response to an activated write enable signal and output set bit values of the address pattern in response to an activated read enable signal.

2. The appliance of claim 1, wherein the module comprises:
   a random access memory (RAM), which temporarily stores a program;
   a read only memory (ROM), which stores data used to operate the Bluetooth communications; and
   a central processing unit (CPU), which uses the RAM while controlling the Bluetooth communications according to data of the ROM, determines the hop sequence corresponding to the set address pattern, and controls information exchange with the second host.

3. The appliance of claim 2, wherein each of the plurality of address setting/storing bits comprises:
   an address setting control unit, which supplies or blocks a first supply voltage and a second supply voltage according to a logic state of corresponding bit value of the input address pattern in response to the activated write enable signal;
   a fuse comprising a cuttable metal connection between terminals of the fuse, wherein the metal is cut using the first supply voltage and the second supply voltage provided to respective terminals of the fuse; and
   an address extracting control unit, which outputs bit values of different logic states corresponding to the open state or closed state of the fuse.

4. The appliance of claim 3, wherein the first supply voltage and the second supply voltage are in a logic high state and in a logic low state, respectively.

5. The appliance of claim 3, wherein the cuttable metal that connects the terminals of the fuse is made of conductive polysilicon.

6. The appliance of claim 3, wherein the address setting control unit and the address extracting control unit are semiconductor circuits using metal-oxide-semiconductor field effect transistors (MOSFET).

7. The appliance of claim 1, wherein the first host is one of a portable audio/video device and a transmitting/receiving device for mobile communications that supports the Bluetooth communications.

8. The appliance of claim 1, wherein the Bluetooth communications is performed using frequency hopping spread spectrum.

9. An appliance comprising:
   a first host, which supports Bluetooth communications, identifies a second host using a hop sequence corresponding to an address pattern set according to an open state or a closed state of an electric fuse, wherein the address pattern corresponds directly to bit values of different logic states corresponding to the open state or closed state of the fuse, outputs to-be-transmitted information to the second host, and displays output information of the second host, wherein the first host comprises a non-memory programmable address storing unit, which receives the address pattern, sets the address pattern using the electric fuse, and outputs bit values of the address pattern set to different logic states according to the open state or closed state of the electric fuse, and wherein the non-memory programmable address storing unit comprises a plurality of address setting/storing bits that receive and set the address pattern in response to an activated write enable signal and output set bit values of the address pattern in response to an activated read enable signal; and a module, which, through the Bluetooth communications, receives the to-be-transmitted information, outputs the information to the second host, processes information received from the second host, and outputs the output information of the second host.

10. The appliance of claim 9, wherein the first host comprises:
 a random access memory (RAM), which temporarily stores a program;
 a read only memory (ROM), which stores data used to operate the Bluetooth communications; and
 a central processing unit (CPU), which uses the RAM while controlling the Bluetooth communications according to data of the ROM, determines the hop sequence corresponding to the set address pattern, and controls information exchange with the second host.

11. The appliance of claim 10, wherein each of the plurality of address setting/storing bits comprises:
 an address setting control unit, which supplies or blocks a first supply voltage and a second supply voltage according to a logic state of corresponding bit value of the input address pattern in response to the activated write enable signal;
 a fuse comprising a cuttable metal connection between terminals of the electric fuse, wherein the metal is cut using the first supply voltage and the second supply voltage provided to respective terminals of the electric fuse; and
 an address extracting control unit, which outputs bit values of different logic states corresponding to the open state or closed state of the electric fuse.

12. A telecommunication method of an appliance including a first host that supports Bluetooth communications and a module that exchanges information with a second host through the Bluetooth communications, the telecommunication method comprising:
 setting and outputting an address pattern, the address pattern set as an open state or a closed state of a plurality of electric fuses, wherein the address pattern corresponds directly to bit values of different logic states corresponding to the open state or closed state of the fuse, wherein the setting and outputting the address pattern comprises receiving and setting the address patterns in response to an activated write enable signal, and outputting bit values of the set address pattern in response to an activated read enable signal, wherein the setting a bit value of the address pattern and outputting the set bit value comprises an address setting control step of supplying or blocking a first supply voltage and a second supply voltage according to a logic state of corresponding bit value of the input address pattern in response to the activated write enable signal;
 identifying the second host by using a hop sequence corresponding to the output address pattern;
 transmitting information output from the first host to the second host; and
 outputting information received from the second host to the first host.

13. The telecommunication method of claim 12, wherein the setting a bit value of the address pattern and outputting the set bit value further comprises:
 a fusing step of cutting metal that connects terminals of a fuse using the first supply voltage and the second supply voltage provided to the terminals of the fuse; and
 an address extracting control step of outputting bit values of different logic state corresponding to the open state or closed state of the fuse in response to the activated read enable signal.

14. The telecommunication method of claim 13, wherein the first supply voltage and the second supply voltage are in a logic high state and in a logic low state, respectively.

15. The telecommunication method of claim 13, wherein the metal that connects the terminals of the fuse is made of conductive polysilicon.

16. The telecommunication method of claim 13, wherein the address setting control and the address extracting control are performed by semiconductor circuits using metal-oxide-semiconductor field effect transistors (MOSFET).

17. The telecommunication method of claim 12, wherein the first host is one of a portable audio/video device and a transmitting/receiving device for mobile communications that supports the Bluetooth communications.

18. The telecommunication method of claim 12, wherein the Bluetooth communications is performed using frequency hopping spread spectrum.

* * * * *